Aug. 16, 1966   J. BELART ETAL   3,266,602
DISC BRAKES

Filed March 1, 1965   2 Sheets-Sheet 2

# United States Patent Office 3,266,602
Patented August 16, 1966

3,266,602
DISC BRAKES
Juan Belart, Walldorf, Fritz Ostwald, Buchschlag, and Karl Schlör, Biebesheim, Germany, assignors to Dunlop Rubber Company Limited, London, England, and Fort Dunlop, Erdington, Birmingham, England, a corporation of Great Britain
Filed Mar. 1, 1965, Ser. No. 435,893
10 Claims. (Cl. 188—73)

This invention relates to disc brakes, and is particularly concerned with the provision of means for automatically adjusting the clearance between the friction elements and the disc after wear of the friction elements has occurred.

According to the invention a disc brake comprises a brake-applying mechanism in which a pair of thrust members are movable in opposite directions to apply the brake and in which an adjustment device is provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism to turn the screw-threaded member in a direction such that it will advance the screw-threaded member to hold the thrust members at a greater distance apart from one another on release of the brake.

According to the invention also, a disc brake comprises a hydraulic brake-applying mechanism in which a pair of thrust members are movable in opposite directions by fluid pressure between the thrust members to apply the brake and an adjustment device is provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism so as to turn the screw-threaded member in a direction such that it will advance the screw-threaded member to hold the thrust members at a greater distance apart from one another on release of the brake.

According to a further aspect of the invention a disc brake comprises a rotatable disc, a non-rotatable support, a caliper having a pair of limbs straddling a periphery of the disc, a pair of friction elements associated with the caliper one each side of the disc, and a hydraulic brake-applying mechanism arranged to move one of the friction elements axially relative to the caliper and into engagement with the disc, the caliper being axially movable relative to the disc by reaction resulting from the engagement of the movable friction element with the disc to bring the other friction element into engagement with the opposite side of the disc, the hydraulic brake-applying mechanism comprising a pair of thrust members movable in opposite directions by fluid pressure to apply the brake and an adjustment device being provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism so as to turn the screw-threaded member in a direction such that it will advance the screw-threaded member to hold the thrust members at a greater distance apart from one another on release of the brake.

One embodiment of the invention will now be described with reference to the accompanying drawings, in which.

Figure 1:
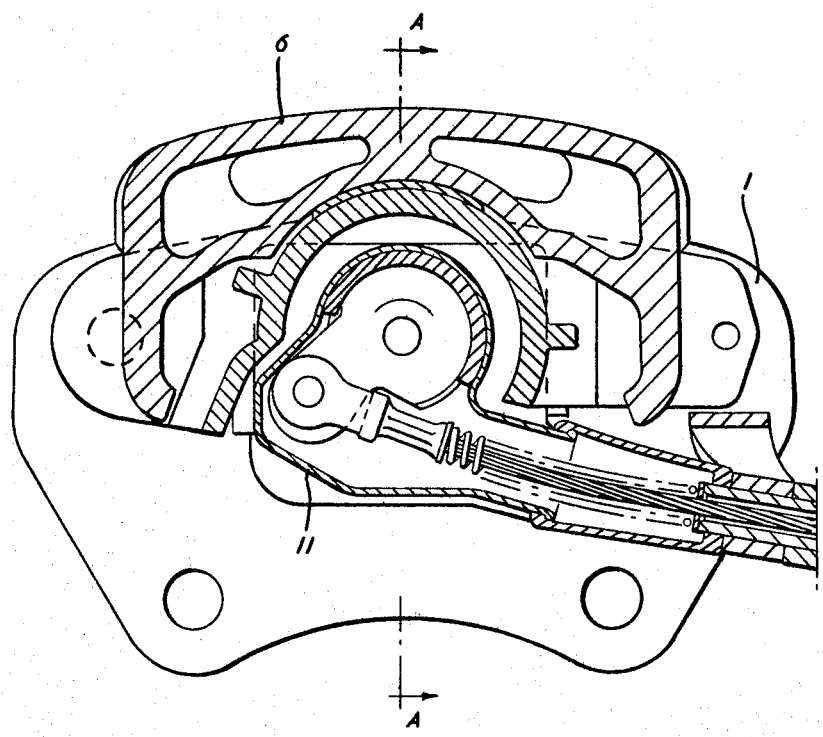
FIGURE 1 is an end cross-sectional view, taken through the manual brake-actuating mechanism, of a disc brake according to the invention.

The disc brake shown in the drawings comprises a brake support bracket 1 which is bent in U-shaped form around the outer periphery of a braking disc 2 and is provided with apertures in which friction pads 3 and 4 are axially slidable to engage the disc.

A caliper 6 comprises an arm 5 on one side of the disc to which the friction pad 3 is fixed, and on the opposite side of the disc the caliper has a bore 7 in which a cylinder 8 of a hydraulic brake operating mechanism 9 is fitted. The cylinder 8 contains an axially slidable piston 10 arranged to exert a brake-applying thrust which is transmitted through a capsule 11, containing a manually-operated brake-actuating device, to the friction pad 4. The caliper 6 is axially slidably mounted on a guide sleeve attached to the support 1 so that the friction pad 3 will be drawn into engagement with the disc by reaction acting on the caliper when the friction pad 4 is pressed against the disc.

An adjustment device 12 is mounted inside the cylinder 8, and consists of an adjustment bolt 14 which is screwed into a screw-threaded bore in the end 13 of the cylinder 8. The other end of the bolt 14 passes axially slidably and fluid-tightly through a bore in the end 16 of the piston 10 and provides an abutment surface 15 which engages the capsule 11.

The adjustment bolt is provided with a stop, in the form of a collar 17, for engagement with the end 16 of the piston, and a second collar 18. A bush 19 is mounted so as to be rotatable but not axially slidable between the collars 17 and 18, and surrounds a portion of the bolt 14 between the collars 17 and 18 which is formed with ratchet teeth 20. A pawl 21 is slidably mounted in a bore of the bush 19 and is pressed into engagement with the teeth 20 by a leaf spring 25 which encircles the bush 19.

A stepped sleeve 23 is force-fitted in the bore 22 of the piston 10 and its reduced-diameter portion is formed with an inclined cam surface 24 which engages a cam follower 26 formed on a projection 34 of the bush 19. The leaf spring 25 is riveted at one end to the reduced-diameter portion of the sleeve 23 and encircles the bush 19 to engage the opposite side of the projection 34.

A piston return spring 27 is compressed between a supporting washer 28 which rests at one end against the collar 18 of the bolt 14 and at its other end engages a flange 29 formed on the sleeve 23, the spring 27 thus tending to draw the piston 10 into the cylinder 8.

Fluid pressure can be supplied to the pressure chamber 30 of the cylinder 8 through a longitudinal bore 31 in the bolt 14, a socket 32 being provided for connection to a hydraulic supply pipe.

Figure 2:
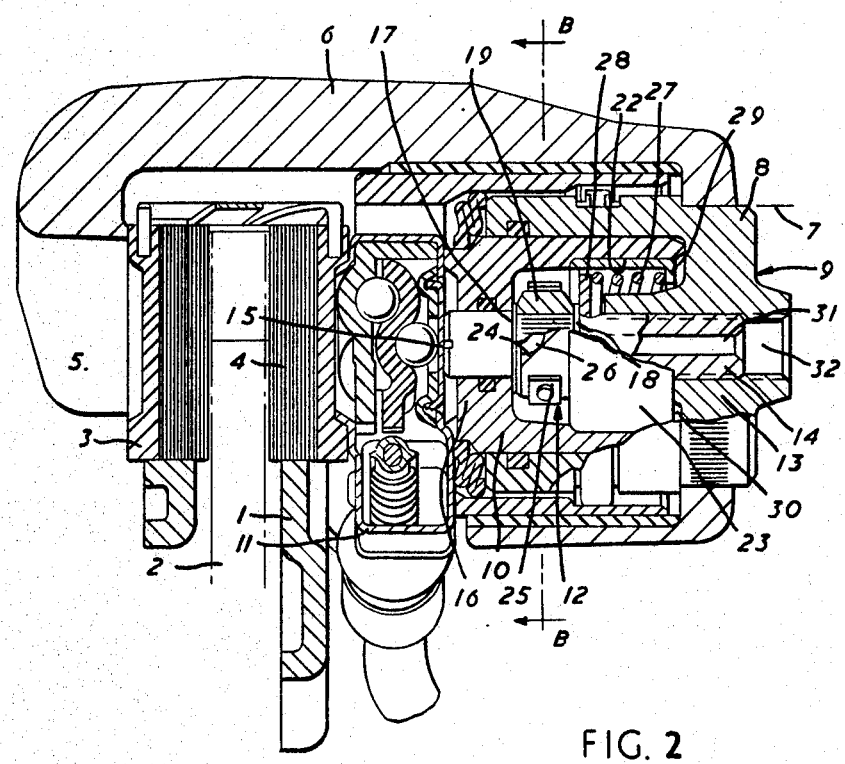
FIGURE 2 is an axial cross-sectional view taken on the line A—A of FIGURE 1.

In operation, the chamber 30 is supplied with fluid under pressure and the piston 10 is moved to the left as seen in FIGURE 2. The thrust applied by the piston 10 to the capsule 11 is transmitted to the friction pad 4, pressing it against the disc 2. The resultant reaction on the cylinder 8 moves the caliper 6 to the right as seen in FIGURE 2, thus drawing the friction pad 3 into engagement with the opposite side of the disc.

As the piston 10 moves relatively to the cylinder 8 the cam surface 24, which is attached to the piston, moves relatively to the cam follower 26, which is attached via the adjustment bolt 14 to the cylinder 8. This relative movement causes the bush 19 to rotate, and the bolt 14 is rotated to take up friction pad wear by the engagement of the pawl 21 with the ratchet teeth 20.

Figure 3:
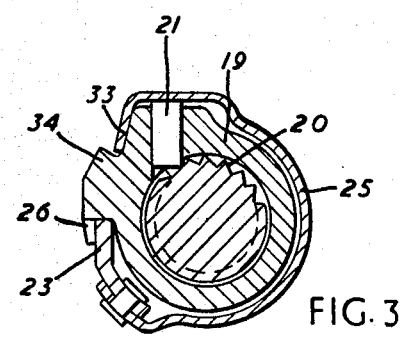
FIGURE 3 is a scrap cross-sectional view, taken on the line B—B of FIGURE 2, of part of an automatic adjustment device.

On release of the brake, the piston return spring 27 moves the piston 10 back until it contacts the stop 17. The position of the piston then differs from its original position by the amount of the adjustment. The bush 19 is rotated in the anti-clockwise direction (as seen in FIGURE 3) on release of the brake by the engagement of the leaf spring 25, which will have been stressed by the clockwise rotation of the bush on application of the brake, with the projection 34. The cam follower 26 will thus be held against the cam surface 24 by the spring 25.

When the expander device (which is of the ball-and-ramp type) contained within the capsule 11 is operated, the abutment face 15 of the bolt 14 provides the necessary reaction which enables a thrust to be developed on the friction pad 4, an equal and opposite thrust being applied through the bolt 14 to the cylinder 8 and thus to the caliper 6.

The automatic adjustment device described above only operates during hydraulic operation of the brake.

Having now described our invention, what we claim is:

1. A disc brake comprising a brake-applying mechanism in which a pair of thrust members are movable in opposite directions to apply the brake and in which an adjustment device is provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism to turn the screw-threaded member in a direction such that it will advance the screw-threaded member to hold the thrust members at a greater distance apart from one another on release of the brake.

2. A disc brake comprising a hydraulic brake-applying mechanism in which a pair of thrust members are movable in opposite directions by fluid pressure between the thrust members to apply the brake and an adjustment device is provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism so as to turn the screw-threaded member in a direction such that it will advance the screw-threaded member to hold the thrust members at a greater distance apart from one another on release of the brake.

3. A disc brake comprising a rotatable disc, a non-rotatable support, a caliper having a pair of limbs straddling a periphery of the disc, a pair of friction elements associated with the caliper, one on each side of the disc, and a hydraulic brake-applying mechanism arranged to move one of the friction elements axially relative to the caliper and into engagement with the disc, the caliper being axially movable relative to the disc by reaction resulting from the engagement of the movable friction element with the disc to bring the other friction element into engagement with the opposite side of the disc, the hydraulic brake-applying mechanism comprising a pair of thrust members movable in opposite directions by fluid pressure to apply the brake and an adjustment device being provided to limit the movement towards one another of the thrust members on release of the brake, the adjustment device comprising a screw-threaded member in screw-threaded engagement with one of the thrust members and having an abutment surface engageable with the other thrust member, a ratchet mechanism associated with the screw-threaded member, and cam means operable by the brake-applying movement of the thrust members to operate the ratchet mechanism so as to turn the screw-threaded member in a direction such that it will advance the screw-threaded member to hold the thrust members at a greater distance apart from one another on release of the brake.

4. A disc brake according to claim 1 wherein the adjustment device comprises a bolt in screw-threaded engagement with one thrust member and having a portion having ratchet teeth formed thereon, a bush surrounding the ratchet portion and rotatable about the axis of the bolt, a pawl carried in the bush and spring-loaded into engagement with the ratchet teeth, a cam follower attached to the bush and a cam attached to the other thrust member, the cam being arranged so that on relative movement of the thrust members away from one another it will rotate the bush in a direction to advance the bolt.

5. A disc brake according to claim 4 wherein a spring is provided to urge the cam follower on the bush against the cam.

6. A disc brake according to claim 5 wherein the spring is a leaf spring which is fastened to the cam and encircles the bush to engage the cam follower.

7. A disc brake according to claim 6 wherein the spring also engages the pawl to urge the pawl into engagement with the ratchet.

8. A disc brake according to claim 4 wherein the thrust members comprise a hydraulic member and a piston member slidable therein, the bolt being disposed coaxially within one thrust member and screw-threadedly engaging a screw-threaded bore in the end wall thereof, the other end of the bolt having a stop formed thereon to engage the other thrust member to limit the movement of the thrust members towards one another on release of the brake.

9. A disc brake according to claim 8 wherein a manually actuated brake-applying mechanism is mounted in axial alignment with the hydraulic mechanism and an associated friction element, said other end of the bolt passing axially slidably through said other thrust member to provide an abutment surface engageable by said manually actuated mechanism.

10. A disc brake according to claim 8 wherein a piston return spring is provided within the cylinder to urge the piston member inwardly with respect to the cylinder member.

References Cited by the Examiner

UNITED STATES PATENTS 2,820,530  1/1958  Chouings et al. ____ 188—196 X
3,158,234  11/1964  Henderson _____ 188—72 X

FOREIGN PATENTS 971,799  10/1964  Great Britain.

MILTON BUCHLER, Primary Examiner.

G. E. A. HALVOSA, Assistant Examiner.